US005726907A

United States Patent [19]
Davidson et al.

[11] Patent Number: 5,726,907
[45] Date of Patent: Mar. 10, 1998

[54] BIAXIAL NON-CONTACTING STRAIN MEASUREMENT USING MACHINE VISION

[75] Inventors: David L. Davidson; Steven B. Seida, both of San Antonio, Tex.

[73] Assignee: Southwest Research Institute, San Antonio, Tex.

[21] Appl. No.: 509,659

[22] Filed: Jul. 31, 1995

[51] Int. Cl.$^6$ .................................................. G01B 11/16
[52] U.S. Cl. ........................... 364/508; 356/32; 73/760
[58] Field of Search ............................... 364/508, 506, 364/507; 73/799, 800, 788, 795, 760, 789, 791, 849; 356/32, 35.5

[56] References Cited

U.S. PATENT DOCUMENTS

| | | | |
|---|---|---|---|
| 4,574,642 | 3/1986 | Fleischman | 73/799 |
| 4,591,996 | 5/1986 | Vachon et al. | 364/508 |
| 4,962,669 | 10/1990 | Gernhart et al. | 73/800 |
| 4,969,106 | 11/1990 | Vogel et al. | 364/508 |
| 5,065,331 | 11/1991 | Vachon et al. | 364/508 |

OTHER PUBLICATIONS

E. A. Franke, D.J. Wenzel and D.L. Davidson, "Measurement of microdisplacements by machine vision photogrammetry (DISMAP)", Rev. Sci. Instrum. 62(5), pp. 1270–1279, May 1991.

D.L. Davidson, "Micromechanics Measurement Techniques for Fracture" in *Experimental Techniques in Fracture* edited by J.S. Epstein, VCH/SEM 1993, pp. 41–57.

*Primary Examiner*—James P. Trammell
*Assistant Examiner*—M. Kemper
*Attorney, Agent, or Firm*—Baker & Botts, L.L.P.

[57] ABSTRACT

A method for measuring strain in a sample of material. A reference image is obtained of a surface of the sample. A test machine is used to apply a load to the sample, as determined by a control signal from a system processor. A measurement image is then obtained, and test points on the reference image are located on the measurement image, using an image processor programmed to perform machine vision. The displacements between the location of the test points on the two images are determined. These displacements are used to calculate strain. Each new strain value may be used by the system processor to determine a next load value, so that the load is adjusted in terms of strain parameters.

20 Claims, 2 Drawing Sheets

BIAXIAL NON-CONTACTING STRAIN MEASUREMENT USING MACHINE VISION

TECHNICAL FIELD OF THE INVENTION

This invention relates to devices for measuring strain in materials, and more particularly to a method of measuring strain in two dimensions simultaneously, using machine vision, without contacts or targets.

BACKGROUND OF THE INVENTION

Determination of materials properties requires determination of static or dynamic strains by means of physical measurements. Various types of devices for strain measurement have been developed. In general, strain measurement systems operate on the principle that if two points on the material under test have been displaced relative to each other, then strain has occurred.

A familiar type of strain measurement device is a strain gage, which may be mechanical or electrical. An example of a mechanical strain gage has a lever to multiply the displacement, which is then read from a suitable scale. An example of an electrical strain gage is a wire device, bonded to the material, where strain changes the resistance of the wire.

Another category of devices for measuring strain includes systems that optically detect displacement. An example of an optical system is a printed grid, where the dimensional change in the grid under load is a measure of the strain produced.

The availability and convenience of computers for image processing has furthered the development of optical strain measurement systems. A recent development has been in the area of using computers to analyze the "speckle pattern" of light reflected from the material under test. The "speckle pattern" is derived from light that a non-mirror-like surface transmits, reflects, or emits when illuminated. The displacement of the speckle pattern between two points in time is indicative of displacement of the material, and hence of strain.

Another use of computers for strain measurements has been to use "machine vision" to measure displacements. More specifically, the computer is provided with data representing a reference image of an area of a sample and a measurement image of the same area after the sample has undergone deformation. The images are aligned and located with respect to a reference location. The machine "trains" on the reference image, identifies test points on the reference images, and then finds these test points on the second image. It can then measure the difference in displacement between the points, from which strain is computed.

SUMMARY OF THE INVENTION

The invention is a method for measuring deformation in a sample of material under stress. First, a digital reference image of a subject area of the surface is acquired. This reference image is stored in a computer. When a load is applied to the sample, such that the surface in the subject area deforms, a second digital image of the surface ("the measurement image") is acquired. Both images are placed in a coordinate system having a reference point. A first test point is designated on the reference image. This test point is then located on the measurement image by matching features in the area around the test point with features in an area of the same size on the measurement image. This locating step is performed with a computer that performs a cross-correlation on data representing the reference image and the measurement image. A displacement value is determined by measuring the distance between the test point and the reference point on the reference image, measuring the distance between the test point and the reference point on the measurement image, and calculating the difference between these two distances. The process of designating a test point, locating it on the measurement image, and measuring displacement is repeated for a number of test points, thereby obtaining a displacement value associated with each test point. These displacement values are used to compute a strain value representing strain caused by the load. Then, the whole process can be repeated for a new load value, hereby acquiring a new measurement image and a new strain value. Each new load value may be determined by the previous strain value, so that a predetermined strain limit or strain rate can be achieved.

An advantage of the invention is that it provides strain measurements of a real object as it undergoes loading. Displacement measurements are made in two directions (biaxial) by the same computational process. One axis may be in the direction of the applied load, with the second axis perpendicular to that direction.

No targets, grids, or other patterns having a specific geometric organization, are required to be placed on the sample. The invention uses natural features of the material under test to measure deformation. Also, no contact with the material by any sort of sensing device is required.

The test system is interactive, which permits an operator to determine test parameters, such as the separation between reference and measurement points, field of view, magnification, and spatial frequency of the test points. However, the operator is not required to align the images because the images are taken by a stationary camera at different points in time.

The method of the invention is performed in real time in the sense that the strain measurements are available as it is occurring. Stress is applied to the sample of material by a test machine in which either load or strain is the controlling variable. The result is either a strain-controlled or a load-controlled test.

DETAILED DESCRIPTION OF THE INVENTION

Figure 1:
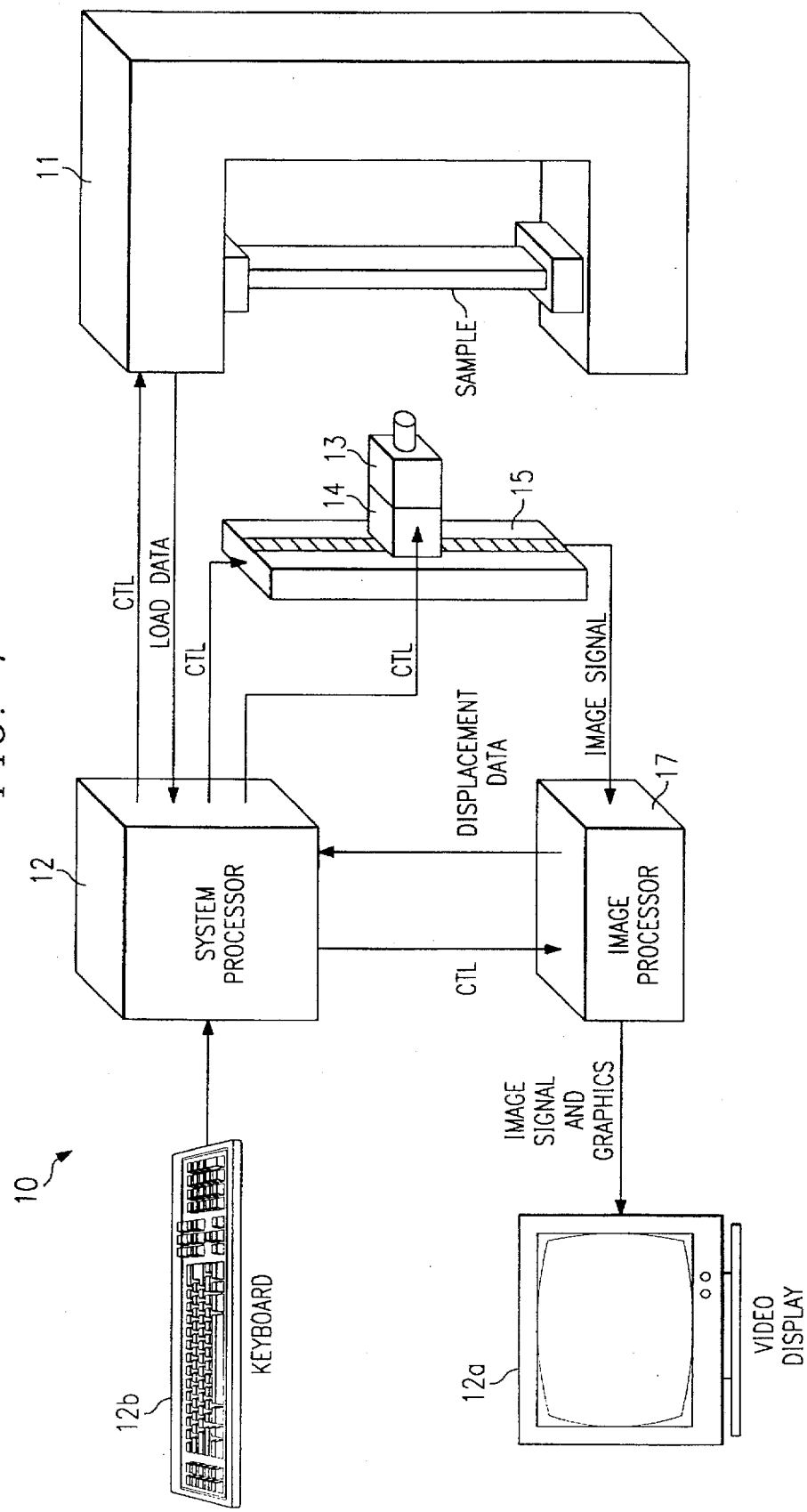
FIG. 1 illustrates a strain measurement system in accordance with the invention.

FIG. 1 illustrates a strain measurement system 10 in accordance with the invention. System 10 is useful for experimentally testing materials response, where a sample of material is subjected to known loads. System 10 operates on the principle that a load applied to the material will result in deformation, which will be manifested by strain at the surface of the material. Thus, strain is a measure of deformation. Depending on the plasticity of the sample material, deformation may result in cracks. This invention is especially useful for crack-related deformation.

As explained below, a feature of the invention is that sensing and control functions are part of a closed loop. This permits the load applied to the sample to be controlled in response to the measured strain. As a simple example, if a strain of value x were specified, the load that results in that strain could be determined. As another example, the strain rate may be controlled by increasing the load only as required to maintain a specified rate.

System 10 includes a load machine 11, which applies either a tensile or compressive load, axially, at one or both ends of the sample. In other embodiments, biaxial loading could also be performed. Load machine 11 is controlled by a test controller 12, which delivers a control signal to control how much load is to be applied to the sample at any given time. Load machine 11 uses servo-hydraulic or lead-screw methods to apply load to the sample.

System processor 12 is a computer connected to a display 12a and a keyboard 12b. As explained below, configuration of an experiment, or test, will include specification of magnification, location of a reference point, location and number of test points, and spatial frequency of test points. Display 12a depicts the images provided by camera 14, and, as explained below, provides various graphics such as an overlay showing the location of each test point.

As indicated in FIG. 1, system processor 12 delivers control signals to test machine 11, camera stage 15, and to image processor 17. For controlling test machine 11, controller 12 specifies an initial load value. As explained below, after the displacement resulting from this load is determined, system processor 12 uses this value to determine a next load value.

System processor 12 also has memory for storing appropriate programming for processing measured displacements. As explained below, these displacements can be related to strains. From these, a variety of strain maps can be graphically presented.

A camera 14 continuously views a test area of the sample and acquires successive images. In the preferred embodiment, camera 14 is a CCD (charge coupled device) camera. However, camera 14 may be any device that captures a real image, regardless of how it is created. Camera 14 may provide still or video images, digital or analog. If the image is video, image processor 17 includes a frame grabber. If the image not in digital form, image processor 17 includes a digitizer. When used with a frame grabber, image processor 17 may also include a signal conditioner that operates on the input signal to provide dc restoration and amplification with programmable gain and offset.

An example of an image provided by camera 14 is 512×512 pixel image, with 6-bit pixel values. The digitized images provided by camera 14 are timed by a control signal from system processor 12.

For high resolution images, camera 14 is used in conjunction with an optical or other magnification device 13, such as a telemicroscope, that magnifies the surface of the sample. Typically, the surface will be magnified so that its features become more visible. The extent of magnification depends upon the size of such features and the area of interest on the sample. The range of magnification might be as much as 1000 times actual size depending on the type of material from which the sample is made. For example, a sample having a smooth material might require more magnification than a sample whose surface is rough, or the tip of a small notch might restrict the area of interest. For a sample having microscopic features, the magnification device 13 could be an electron microscope.

If desired, a specific test area on the sample can be tracked and camera 14 can be moved axially to follow any displacement within the surface area as load is applied. As explained below, location data from image processor 17 may be used by system processor 12 to control stage 15 so that camera 14 maintains its field of view as the load is applied. In any event, it is assumed that the surface area of interest remains in the field of view of camera 14. Once the strain in one area is determined, the field of view can be changed to test different areas if desired.

Image processor 17 operates on a digital signal representing each image from camera 14. Image processor 17 includes digital storage for both a reference image and a current measurement image. As explained below, these images are located with respect to a common reference point and have the same magnification and orientation. Essentially, the images are of the same scene at different points in time. Image processor 17 is programmed to "find" a point from the reference image in the measurement image by matching features in the area of that point. It does this using "machine vision" techniques.

In the preferred embodiment, image processor 17 is a machine vision processing system such as the COGNEX 2000, commercially available from the Cognex Corporation. However, for purposes of this invention, image processor 17 could be any processor constructed and programmed to perform machine vision, defined as the ability to match an area in one image to an area in another image on the basis of feature recognition.

Further details of a strain measurement system, which uses machine vision to measure displacement but lacks the real-time control features of the present invention, are set out in an article entitled "Micromechanics Measurement Techniques for Fracture" by David L. Davidson, published in *Experimental Techniques in Fracture*, VCH 1993, pp. 41–57.

In operation, the sample is positioned in loading machine 11, and the operator selects a field of view using display 12a and camera 13. The operator views display 12a to determine whether the magnification is sufficient to identify features, and if it is not, adjusts the magnification system accordingly.

Image processor 17 provides a graphics overlay over the image that locates the test points. For example, the overlay might be a grid with the center of each grid square representing a test point. The spatial frequency of the test points can be adjusted by the operator, which results in a corresponding expanding or contracting of the overlay. More test points will result in more displacement measurements, and thus a more precise strain value. On the other hand, depending on processing speed, fewer test points may result in faster system output of strain values. By adjusting the spatial frequency of the test points, the operator can ensure that the system results are real time, relative to the rate of the applied load.

Camera 14 is used to capture a reference image of subject area of the sample. For purposes of this description, it is assumed that camera 14 provides video signals, and that image processor 17 includes a frame grabber. The digitized reference image is stored in image processor 17.

Next, the operator specifies load parameters, such as an initial load and a load rate. In response, system processor 12 provides a load signal to test machine 11, which is in accordance with the specified initial load value. Test machine 11 then applies this load to the sample.

After the load is applied, system processor 12 directs camera 14 to acquire a measurement image. Like the reference image, the measurement image is digitized and stored. The images have the same magnification. Because the orientation of camera 14 does not change, the orientation of the images is constant and no alignment is required.

Figure 2A:
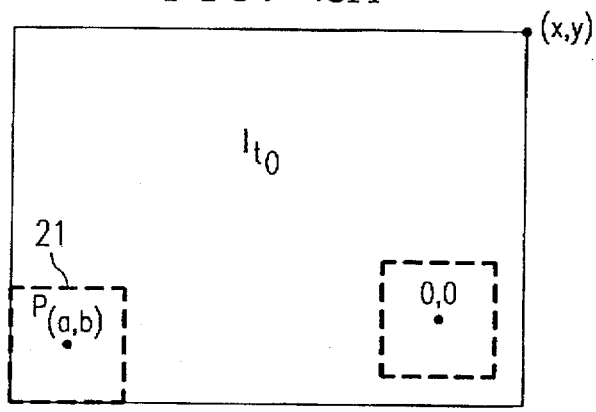
FIGS. 2A and 2B illustrate a reference image and a measurement image, respectively.
Figure 2B:
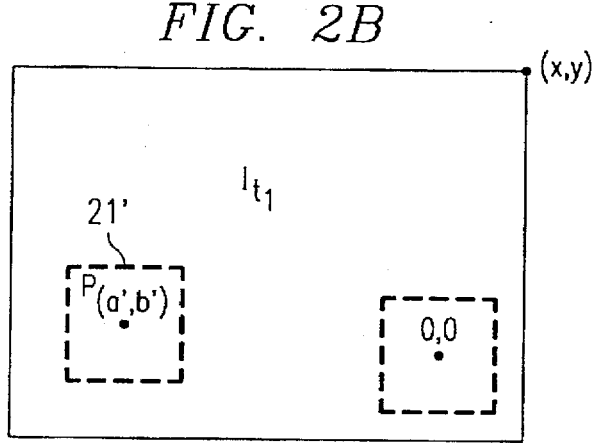

FIGS. 2A and 2B illustrate the reference image, $I_{r0}$, and the measurement image, $I_{r1}$, respectively. The two images are oriented with respect to location coordinates. The location coordinates have a common reference point, (0,0). Also, the two images are aligned with respect to each other, thus for example, point (x,y) corresponds to the upper right hand corner of each image.

Once the two images have been stored and oriented, a test point, P(a,b), is designated on the reference image. Next, a computer vision process is used to find the test point on the second image. During the machine vision process, image processor 17 trains on a test area 21 of the reference image. It then searches the measurement image to find an area 21' of the same size having the closest match of features. The searching function is an enhanced cross-correlation template matching procedure. A feature is represented in image processor 17 by a specific pattern of grey levels called a template. Features are located with a cross-correlation model matching algorithm in which a similarity function is defined between the template and a target region of another image, where the target region is the same size as the template. The value returned by the similarity function is called the correlation value.

In the preferred embodiment, a normalized correlation matching algorithm is used. It is independent of linear differences in brightness and represents an absolute measure of the similarity. For normalized correlation, the correlation coefficient, r, between the template and the target, which has an offset (u,v), is expressed by $$r(u,v) = \frac{N \sum_i I_i M_i - (\sum_i I_i)(\sum_i M_i)}{\sqrt{\left[N \sum_i I_i^2 - \left(\sum_i I_i\right)^2\right]\left[N \sum_i M_i^2 - \left(\sum_i M_i\right)^2\right]}},$$

where I is the target image, M is the template image, $M_i$ is the template pixel location, $(x_i, y_i)$, $I_i$ is the target pixel location $(u+x_i, v+y_i)$, and N is the number of pixels in the template image. A correlation value of r=1 indicates a perfect match, r=0 is no correlation, and r=−1 is a perfect mismatch.

For real time template matching, artificial intelligence techniques may be used as part of the analysis process, which can minimize the number of locations where a correlation must be computed. Fast estimators of position can be used to evaluate the image for areas where the features are most likely to be found. For example, if the intensity histogram of an area resembles that of the template, then it is likely that the template is located in that area.

A feature of the invention is that it permits parameters such as magnification, size of the test area, and lighting, to be adjusted if the matching process does not provide adequate correlation values. Both the number of features in the test area and the fineness of the their definition are important parameters. Ideally, test area contains a large number of fine features, and the lighting conditions capture enough contrast to provide a range of grey levels.

The process of designating and finding a test point can be repeated for as many test points as are desirable. If the test area 21 begins to move out of the field of view, camera stage 15 can be used to re-center the test area. The location coordinates of the new measurement image from the new field of view are adjusted accordingly. This field of view adjustment can be accomplished automatically by delivering the coordinate values of the test area 21', after it is located, to system processor 12, which then determines if a field of view adjustment will likely be needed for the next image. Where a pattern of test areas has been specified, the control signal to camera stage 15 is based on the results of the matching process performed by image processor 17, as well as on the location of the next test area. A known pattern of test areas, such as a scanning pattern within a grid of test areas, can be used to cause camera stage 15 to follow a look-ahead function.

Figure 3:
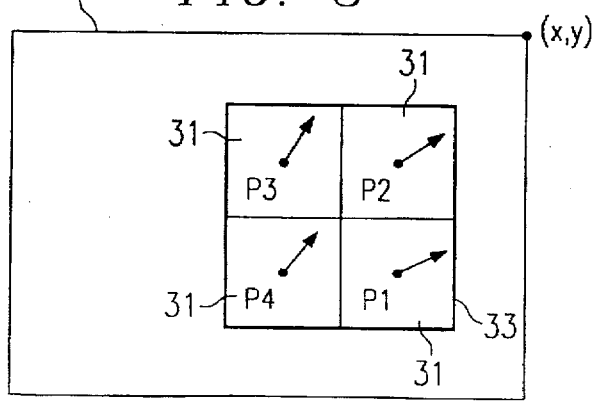
FIG. 3 illustrates a measurement image having a superimposed test grid and displacement vectors.

FIG. 3 illustrates a measurement image, $I_{r0}$, which has four test areas 31, an overlaid grid 33, and four test points, P1–P4. Displacements are indicated by vectors, which show the direction and magnitude of the displacement. In the reference image, the test point was at the center of each square area. In the measurement image, the test point is at the end of the vector. Once the displacement values for the test area have been determined, these values are delivered to system processor 12 for further analysis. The three elements of the symmetric strain tensor, which are axial, transverse, and shear strain, are computed from the gradients of displacement. These values are tabulated together with the corresponding load value. Effective strain can be computed from the strain tensor, as can the maximum and minimum principle strains and maximum shear strain. The strain tensor can be used to compute Poisson's ratio and the elastic modulus.

For each load, one or more test points are matched to obtain displacement values, from which strain values are calculated. Then, the load is adjusted. The load adjustments can be performed automatically in accordance with a specified load rate or strain rate. Alternatively, the interactive nature of the test system permits the load rate to adjusted in response to the an operator's visual evaluation of the deformation as it occurs.

System processor 12 includes programming and timing devices to synchronize load machine 11, camera 14, and image processor 17. After each new load is applied in response to a control signal to load machine 11, the control signal to camera 14 causes a new measurement image to be acquired. The control signal to image processor 17 causes the image data to be transmitted and analyzed. Each new strain calculation by system processor 12 can cause calculation of a new load value and repetition of the displacement measurement process.

The control and feedback signals of system 10 can be used to obtain measurements iteratively, at desired strain levels. Such measurements can be used to provide an accurate stress-strain profile of a given material. The profile will indicate non-linear as well as linear relationships, which are difficult to predict mathematically and to obtain experimentally with other test systems.

If desired, the strain feedback feature of the invention can be used to cycle the sample through a series of loaded and unloaded states. Load can be applied to the sample to a specified strain value, while one or more images are analyzed. Then, the load is removed and reapplied to the same strain level or a different strain level, and the analysis repeated. A series of load conditions can be used to determine how the sample will behave under periodic stress at rapid frequencies.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A real-time method of measuring strain in a material under test, as indicated by deformation of the surface of the material, comprising the steps of:

performing image acquisition by acquiring a digital reference image of said surface; storing said reference image in a computer; applying a load to said material, as determined by a load value, such that said load deforms said surface at said test area; acquiring a digital measurement image of said surface; storing said measurement image in said computer;

performing data processing by placing said reference image and said measurement image in a coordinate system having a reference point; designating a first test point having a surrounding test area on said reference image; locating said first test point on said measurement image by matching at least one feature in said test area with features on said measurement image, wherein said locating step is performed with a computer programmed to perform a cross-correlation process on data representing said reference image and said measurement image; measuring a displacement value by measuring the distance between said test point and said reference point on said reference image, measuring the distance between said test point and said reference point on said measurement image, and calculating the difference between said distances; repeating said designating, locating, and measuring steps for a number of test points, thereby obtaining a displacement value associated with each test point; using said displacement values to determine a strain value representing strain caused by said applying step; and performing feedback control by repeating said applying step and all subsequent steps for a new load value, using said strain value to determine said new load value, and thereby acquiring a new measurement image and a new strain value;

wherein said image acquisition, processing, and control steps occur in real time.

2. The method of claim 1, wherein said acquiring steps are performed by converting an analog video signal into a digital signal.

3. The method of claim 1, and further comprising the step of analyzing said digital reference image to determine if features are sufficiently evident to perform said locating step.

4. The method of claim 3, further comprising the step of adjusting magnification in response to said analyzing step.

5. The method of claim 3, further comprising the step of adjusting the size of said test area in response to said analyzing step.

6. The method of claim 1, wherein said designating step is performed by viewing said reference image through a superimposed grid.

7. The method of claim 6, wherein each said test point is at the center of a region of said grid and said test area is an area of said grid.

8. The method of claim 1, wherein said step of repeating said applying step and all subsequent steps is performed by using said strain value to maintain a predetermined strain rate.

9. The method of claim 1, wherein said step of repeating said applying step and all subsequent steps is performed iteratively in predetermined strain increments.

10. The method of claim 1, wherein said step of repeating said applying step and all subsequent steps includes the additional step of using said displacement value to determine the location on said surface of said new measurement image.

11. The method of claim 1, further comprising the steps of using synchronized control signals to time said applying step and all subsequent steps.

12. A real-time method of measuring strain in a material under test, as indicated by deformation of the surface of the material, comprising the steps of:

performing image acquisition by acquiring a digital reference image of said surface; storing said reference image in a computer; applying a load to said material, as determined by a load value, such that said load deforms said surface at said test area; acquiring a digital measurement image of said surface; storing said measurement image in said computer; and performing data processing by placing said reference image and said measurement image in a coordinate system having a reference point; designating a first test point having a surrounding test area on said reference image; locating said first test point on said measurement image by matching at least one feature in said test area with features on said measurement image, wherein said locating step is performed with a computer programmed to perform a correlation process on data representing said reference image and said measurement image; measuring a displacement value by measuring the distance between said test point and said reference point on said reference image, measuring the distance between said test point and said reference point on said measurement image, and calculating the difference between said distances; repeating said designating, locating, and measuring steps for a number of test points, thereby obtaining a displacement value associated with each test point; using said displacement values to determine a strain value representing strain caused by said applying step;

wherein said image acquisition and processing steps occur in real time as a result of interactive adjustment to test parameters.

13. The method of claim 12, wherein said acquiring steps are performed by converting an analog video signal into a digital signal.

14. The method of claim 12, wherein said interactive adjustment to test parameters is adjustment to parameter affecting feature identification.

15. The method of claim 14, wherein said parameter affecting feature identification is magnification of said reference image and said measurement image.

16. The method of claim 14, wherein said parameter affecting feature identification is the size of said surface included within said reference image and said measurement image.

17. The method of claim 12, wherein said designating step is performed by viewing said reference image through a superimposed grid.

18. The method of claim 17, wherein each said test point is at the center of a region of said grid and said test area is an area of said grid.

19. The method of claim 12, further comprising the steps of using synchronized control signals to time said applying step and all subsequent steps.

20. The method of claim 12, wherein said interactive adjustments to test parameters are adjustments to the spatial frequency of said test points.

* * * * *